Feb. 15, 1927.
C. C. AVERILL
1,617,740
PROCESS FOR BREAKING PETROLEUM EMULSIONS
Filed May 3, 1926
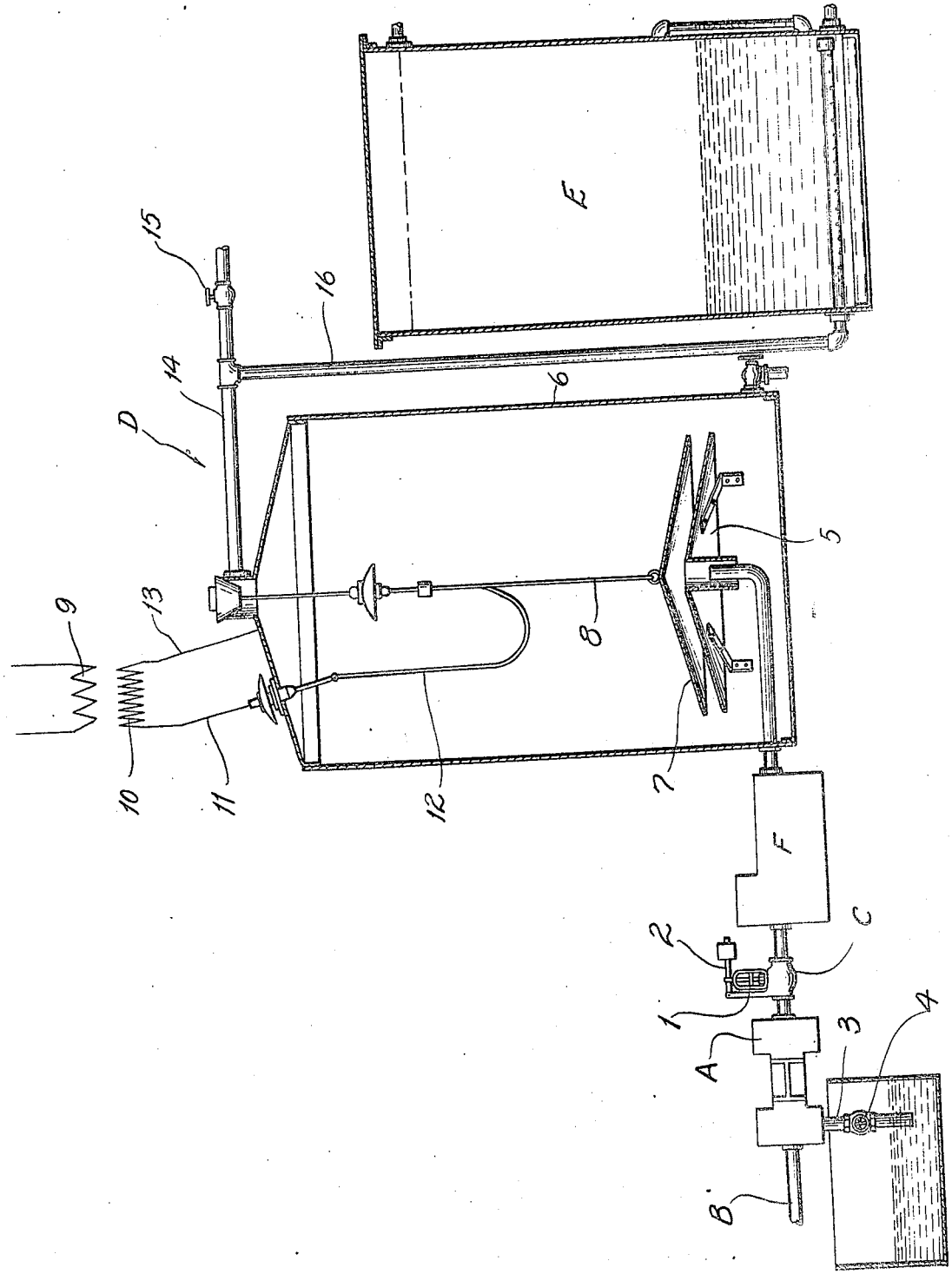
INVENTOR:
CHARLES C. AVERILL
BY Bakewell & Church
ATTORNEYS.

Patented Feb. 15, 1927.

1,617,740

UNITED STATES PATENT OFFICE.

CHARLES C. AVERILL, OF HOUSTON, TEXAS, ASSIGNOR TO WM. S. BARNICKEL & COMPANY, OF WEBSTER GROVES, MISSOURI, A CORPORATION OF MISSOURI.

PROCESS FOR BREAKING PETROLEUM EMULSIONS.

Application filed May 3, 1926. Serial No. 106,417.

This invention relates to the treatment of emulsions of mineral oil and water, such as petroleum emulsions for the purpose of "breaking" the emulsion, and thus causing or permitting the oil to separate from the water.

Petroleum emulsions are of the water-in-oil type and comprise fine droplets of natural occurring waters or brines dispersed in a more or less permanent state throughout the oil which constitutes the continuous phase of the emulsion. They are obtained from producing wells and from the bottoms of storage tanks and are commonly referred to as "cut oil", "roily oil", "emulsified oil", "bottom settlings", etc.

The object of my present invention is to provide a novel and inexpensive process for separating emulsions of the kind referred to into their component parts of oil and water or brine, so as to obtain merchantable oil that will be accepted by pipe line companies.

One process now in use for breaking petroleum emulsions, known commercially as the electrical dehydration process, employs a means for subjecting the emulsion to electric tension for the purpose of agglomerating the water into large masses which tend to separate from the oil, but said process cannot be used successfully for breaking some petroleum emulsions, and when used for treating certain other kinds of petroleum emulsions, the cost is prohibitive from a commercial standpoint. It has been proposed by various patents of the prior art to break such emulsions by vigorous agitation and the addition of water, but it is recognized by the oil industry that vigorous agitation or homogenization of an emulsion, with or without the addition of water, is not a satisfactory or commercial process for breaking "cut oil", "roily oil", "bottom settlings" and other natural occurring petroleum emulsions of the water-in-oil type, which fact is confirmed by the article on page 41 of the Bureau of Mines Technical Bulletin No. 304, which contains the following statement:

"Theoretically, the addition of a large excess of the dispersed phase, water, in tar emulsions, should bring about a separation. In tar emulsions separation does not happen when a moderate excess of water is used, with some agitation or mixing."

I have discovered that practically all emulsions can be broken satisfactorily and at a cost sufficiently low to make electrical dehydration commercially feasible, if the emulsion is subjected to homogenization prior to subjecting the emulsion to electrical tension, the term "homogenization" being herein used in its commercial sense to mean vigorous, intensive, disruptive agitation to cause a decreased particle size of the dispersed phase as described in Clayton's "Emulsions and emulsification". Accordingly, I claim to have discovered or devised a process of great utility and economic worth by which merchantable pipe line oil can be recovered economically from any resistant petroleum emulsions, even those emulsions which are not amenable to treatment by the electrical dehydration process.

Briefly described, my process consists in subjecting a natural occurring petroleum emulsion of the water-in-oil type, to intensive agitation or homogenization, with or without the addition of water, subsequently subjecting said emulsion to electrical tension between electrodes maintained at high potential difference, and thereafter, if necessary, permitting the treated product to remain in a quiescent state; whereupon the oil and water will separate by gravity. In most instances it is not necessary to add water to the emulsion during or prior to the homogenizing operation, or cause the treated liquid to remain in a quiescent state after being subjected to electrical dehydration, but with some emulsions this procedure is desirable.

Various types and kinds of apparatus can be used for practising my process, so long as said apparatus comprises a means for subjecting the emulsion to homogenization or vigorous agitation, an electrical dehydrator for subjecting the emulsion to electrical tension after the homogenizing operation, and a settling tank or the like into which the treated product can be introduced, if necessary or desirable. In most instances, however, the product discharged from the dehydrator will be merchantable oil acceptable by the pipe line companies.

The figure of the drawings is a diagrammatic, vertical sectional view of an apparatus that can be used for practising my process.

Referring to said drawings, A designates a pump that is used for drawing the emulsion from a source of supply through a line B, C designates a device for homogenizing the emulsion or subjecting it to intensive agitation, D designates an electrical dehydrator to which the emulsion is supplied after the homogenizing operation, and E designates a settling tank into which the treated product can be passed from the electrical dehydrator D, if necessary. Any suitable means can be used for homogenizing the emulsion such as a valve C arranged in the line through which the emulsion is supplied to the electrical dehydrator and constructed or adjusted so that the passage of the emulsion through said valve subjects the emulsion to a vigorous agitation. The type of valve or homogenizing device C that I have used extensively in the oil fields is provided with a tapered valve member arranged with its peripheral edge spaced slightly away from a tapered valve seat, a stem 1 attached to said valve member, and a weighted lever 2 that acts on the stem 1 and holds the valve member in adjusted position. In order that water may be added to the emulsion, a water supply pipe 3 is connected to the intake of the pump A, said water supply pipe being provided with a valve 4 that can either be closed or adjusted so as to add water to the emulsion, depending upon the character or nature of the emulsion.

The electrical dehydrator D may either be of the type commonly referred to as a Cottrell dehydrator that employs an electrical field of a potential difference of around 11,000 volts, or it may be of a type suitable for use in carrying out the process described in U. S. Patent No. 1,570,209, to J. H. C. De Brey, dated January 19, 1926, which contemplates the use of a much higher voltage. In the apparatus herein illustrated the electrical dehydrator D is of conventional construction and comprises a grounded electrode 5 supported inside of a metal tank 6, a live electrode 7 arranged above and in spaced relation to the grounded electrode, a rod 8 from which the live electrode 7 is suspended, a transformer provided with a primary 9 and a secondary 10, one terminal 11 of said secondary 10 being electrically connected by a flexible wire 12 to the rod 8 and the other terminal 13 of said secondary being directly connected to the tank 6. At the upper end of the tank 6 of the dehydrator is a discharge pipe 14 provided with an outlet valve 15 and a branch 16 that leads to the settling tank E. In instances where it is necessary or desirable to have the liquid remain in a quiescent state after passing through the dehydrator, the valve 15 is closed so as to cause the treated liquid escaping from the dehydrator to pass into the settling tank E.

After being subjected to the homogenizing operation produced by the device C, the emulsion passes into the electrical dehydrator D, wherein it is subjected to electrical tension between the electrodes 5 and 7. If desired, the treated liquid or product can be introduced into the settling tank E, after escaping from the dehydrator, so as to cause the oil and water of the emulsion to separate by gravity. In most instances it is unnecessary to heat the emulsion, but in order that the emulsion may be heated when necessary or desirable, prior to passing it through the electrical dehydrator, the apparatus is provided with a heater F arranged in the line through which the emulsion travels to the dehydrator after being subjected to homogenization.

Having thus described my invention, what I claim as new and desire to secure by Letters Patent is:

1. A process for breaking a natural occurring petroleum emulsion of the water-in-oil type, characterized by homogenizing the emulsion and subsequently subjecting the emulsion to electrical dehydrating action.

2. A process for breaking natural occurring petroleum emulsions of the water-in-oil type, characterized by adding water to the emulsion and subjecting the emulsion to homogenization and subsequently subjecting the emulsion to electrical dehydrating action.

3. A process for breaking a petroleum emulsion of the water-in-oil type, consisting in subjecting the emulsion to homogenization, thereafter subjecting the emulsion to electrical dehydration, and finally permitting the emulsion to remain in a quiescent state.

CHARLES C. AVERILL.